(12) United States Patent
Lee et al.

(10) Patent No.: US 10,446,088 B2
(45) Date of Patent: Oct. 15, 2019

(54) POWERING MOBILE DEVICE DISPLAYS USING DIFFERENT VOLTAGE RANGES

(71) Applicant: Intel Corporation, Santa Clara, CA (US)

(72) Inventors: Yiting Lee, Taipei (TW); Nobuyuki Suzuki, Portland, OR (US); Gang Ji, Santa Clara, CA (US); Jackson Tsai, New Taipei (TW); Jimmy Y. Hsiao, Taipei (TW)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 15/373,288

(22) Filed: Dec. 8, 2016

(65) Prior Publication Data

US 2018/0166005 A1 Jun. 14, 2018

(51) Int. Cl.
*G09G 5/00* (2006.01)
*G09G 3/34* (2006.01)
*G06F 1/26* (2006.01)

(52) U.S. Cl.
CPC .......... *G09G 3/3406* (2013.01); *G06F 1/263* (2013.01); *G09G 2320/064* (2013.01); *G09G 2330/021* (2013.01); *G09G 2340/0407* (2013.01); *G09G 2360/04* (2013.01)

(58) Field of Classification Search
CPC ........... G09G 3/2092; G09G 2330/021; G09G 3/3406; G09G 2360/04; G09G 2320/064; G09G 2340/0407; G06F 1/26; G06F 1/263
See application file for complete search history.

(56) References Cited

U.S. PATENT DOCUMENTS

2015/0207339 A1* 7/2015 Hamburgen ........ H01M 10/441
320/103

OTHER PUBLICATIONS

Ren et al., "Two-Stage Approach for 12V VR", IEEE, 2004, 7 pages, USA.

* cited by examiner

*Primary Examiner* — Jonathan A Boyd
(74) *Attorney, Agent, or Firm* — International IP Law Group, P.L.L.C.

(57) ABSTRACT

An example apparatus for powering a mobile device display includes a first voltage regulator electronically to be electronically coupled to a display backlight and to a power rail. The power rail is coupled to a power source to provide a first voltage within a first range of voltages. The first voltage regulator is to provide a second voltage within a second range of voltages to the display backlight. The apparatus also includes a second voltage regulator to be electronically coupled to display electronics of the mobile device display and the power rail. The second voltage regulator is to provide a third voltage within a third range of voltages to the display electronics. The first range of voltages, the second range of voltages, and the third range of voltages, are different voltages.

18 Claims, 5 Drawing Sheets

200

POWERING MOBILE DEVICE DISPLAYS USING DIFFERENT VOLTAGE RANGES

BACKGROUND

In mobile personal computing devices, power and data may be provided to a display by a platform via one or more cables. For example, the display may be a liquid crystal display (LCD) with a backlight.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
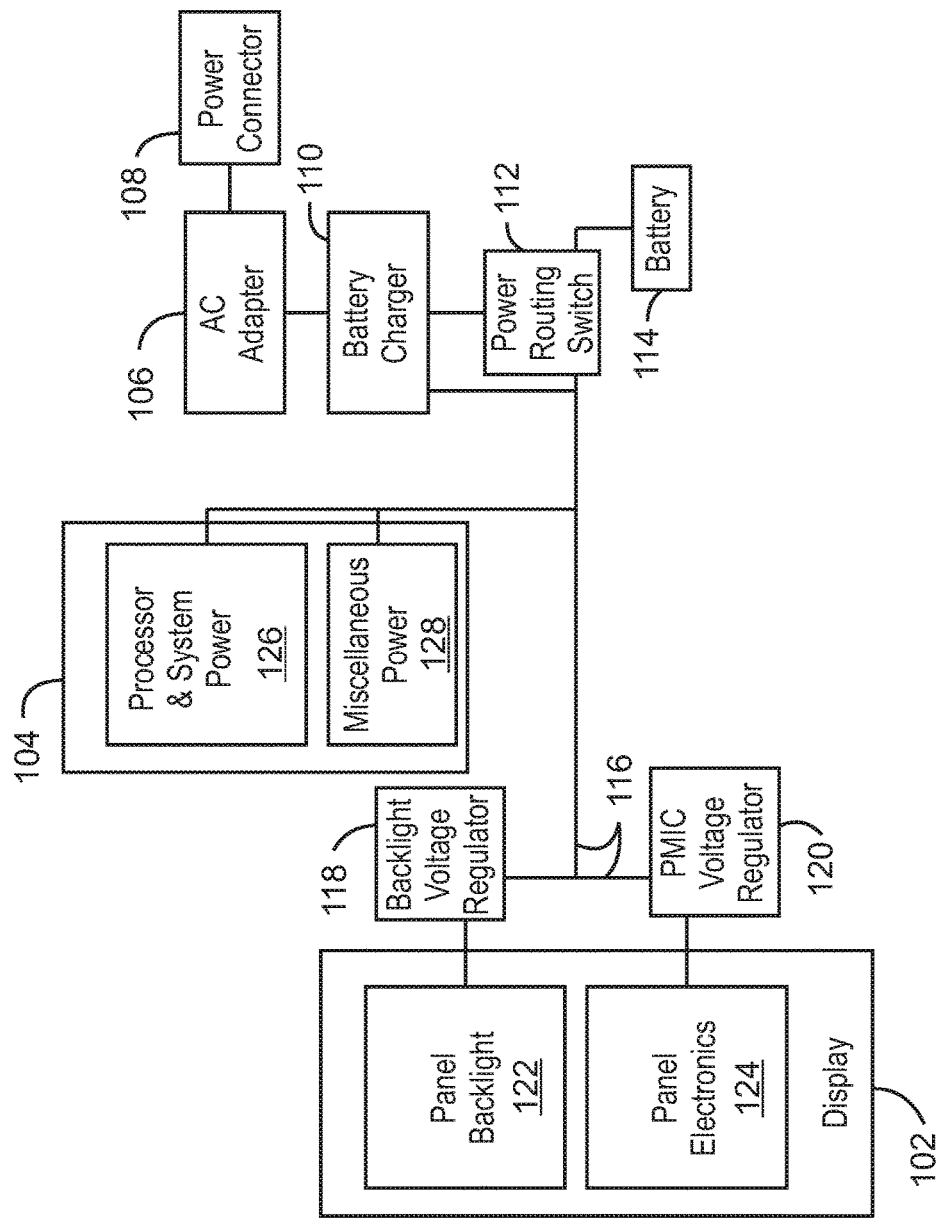
FIG. 1 is a block diagram illustrating an example system for powering a mobile device display.

As discussed above, power and data may be provided to a display by a platform via one or more cables. In notebook displays, a wide range of voltage inputs may be supplied for the power of display electronics and display backlights. For example, voltage input ranges of power load may be 3.3 volts (V) in some display power management integrated circuits (PMIC) and timing controllers (TCON). In some examples, any other voltage input range may be used. In some examples, the voltage input ranges may be 6 to 21 volts for some display LED backlight drivers. However, the power supplied to the display may undergo two or more conversions, resulting in reduced power efficiency. Moreover, the input voltage range in some mobile devices may be wider to accommodate both a higher voltage of an AC mode with a higher voltage AC adapter and a lower voltage of a DC mode using a lower voltage battery. For example, the range of voltage may be 10 volts or greater.

In addition, mobile device users desire both high resolution displays as well as long battery life. However, higher resolution displays may use more power. For example, 15.6" Ultra High Definition (UHD) displays with a resolution of 3840 pixels×2160 lines may consume 5-7 watts. Moreover, some mobile displays may not be efficiently powered.

The present disclosure relates generally to techniques for efficiently powering mobile device displays. Specifically, the techniques described herein include an apparatus, method and system for powering mobile device displays using different voltage ranges. An example apparatus includes a first voltage regulator coupled to a display backlight and a power rail. The first voltage regulator can provide a first narrow voltage range to the display backlight. As used herein, a narrow voltage range refers to a voltage that may have a particular voltage value with some tolerance. For example, a narrow voltage range may be a predetermined number of volts plus or minus a tolerance value. For example, the tolerance value may be 3% or 5%. In some examples, a particular narrow voltage range may be based on the voltage to be used by an apparatus, such as the display backlight or display electronics. The apparatus further includes a second voltage regulator coupled to display electronics of the mobile device display and the power rail. The second voltage regulator can provide a second narrow voltage range to the display electronics. The techniques described herein thus enable power to be supplied to the display backlight and the display electronics without multiple conversions. For example, the power rail may provide a third narrow voltage range from a power source directly to the voltage regulators without power loss due to multiple conversions. In particular, the present techniques may avoid power loss due to a voltage conversion to a processor and system voltage and another conversion from the processor and system voltage into a display voltage. In some examples, the techniques may include the use of a second rail to provide a fourth narrow voltage range to the second voltage regulator. For example, the second voltage regulator may provide the fourth narrow voltage range from a miscellaneous power unit of the system. In some examples, the present techniques may save power during display of static images. For example, when a displayed image remains static, the output current to the display electronics can be reduced because the power voltage of LCD PMIC is changed from 3.3 volts to a higher 6-8.4 volts. In some examples, silicon efficiency of the system may also be improved by removing 3.3 volt pins from the system power to the display power of previous designs. For example, such pins may no longer be used to power the display. In addition, the techniques may enable power to be saved by providing narrow voltage ranges to the panel backlight and the panel electronics. For example, the display driver integrated circuit can be designed for one of the narrower voltage ranges and thus be more power efficient. In some examples, the power saving can be particularly significant when full high-definition (FHD) or greater resolution with high color is implemented on a mobile device using techniques described herein.

FIG. 1 is a block diagram illustrating an example system for powering a mobile device display. The example system is referred to generally by the reference number 100 and can be implemented in the computing device 500 below in FIG. 5. For example, the example system 100 can be implemented in the display interface 516 and display device 518 of the computing device 500 below.

The example system 100 includes a display 102. For example, the display can be a liquid crystal display (LCD), a micro light-emitting diode (μLED) display, or an organic light-emitting diode (OLED) display, among other types of displays. The system 100 further includes a power management unit and system 104. For example, the power management unit and system 104 may provide power to the processor, system, and devices, as discussed below. The system 100 may further include an alternating current (AC) adapter 106. For example, the AC adapter 106 can be used to convert alternating current into a direct current at a higher voltage. For example, the higher voltage may be 19 volts. The system 100 may further include a power connector 108. For example, the power connector may be used to connect the system to an AC power source (not shown). The system 100 also includes a battery charger 110, a power routing switch 112, and a battery 114. For example, the power routing switch 112 may be a field-electric transistor (FET), such as a metal-oxide-semiconductor field-effect transistor (MOSFET). In some examples, the power routing switch 112 may be a low-voltage FET. For example, the low-voltage FET may operate at a voltage within a range of 6 volts-8.4 volts. In some examples, the low-voltage FET may operate within wider ranges of voltage based on the power source. For example, the low-voltage FET may operate within a voltage range of 5.6 to 9 volts with a two cell battery power source. In some examples, the low-voltage FET may operate within a voltage range of 8.4 to 13.5 volts with a three cell battery power source. The power routing switch 112 can be used to switch between different power sources, such as the battery charger 110 or a battery 114. For example, the battery charger 110 may convert higher voltage to a lower narrow voltage range used by the battery 114. For example, the lower narrow voltage range may be 8.4 volts +/−5%. The system 100 also includes a power rail 116 connecting the battery charger 110, the power routing switch 112, a backlight voltage regulator 118, and a power management integrated circuit (PMIC) voltage regulator 120. In some examples, the voltage regulators 118, 120 may be linear voltage regulators. In some examples, the voltage regulators 118, 120 may be pulse width modulators (PWMs). In some examples, the voltage regulators 118, 120 may include negative feedback control loops. The display 102 further includes a panel backlight 122. For example, the panel backlight 122 can be one or more light sources for providing illumination to a display. The system 100 may also include a panel electronics 124. For example, the panel electronics may include a switchable array of pixels that filter light from the panel backlight 122. The panel electronics 124 may also include electronics using a number of voltages, such as positive bias voltage (VGH1), negative bias voltage (VGL), backplane voltage (VCOM), and timing controller (TCON voltages. The power management unit and system 104 also includes a processor and system power unit 126 and a miscellaneous power unit 128. For example, the processor and system power unit 126 may provide power to the processor and one or more components of the system. The miscellaneous power unit 128 may provide power to one or more additional components. For example, the one or more additional components may include USB components or other components that can be connected to and powered by the system.

As shown in FIG. 1, the power rail 116 may provide a narrow voltage range from a power source. For example, the power source may be the battery 114 or a battery charger 110. For example, the power connector 108 may provide AC power to the AC adapter 106. In some examples, the AC adapter 106 may convert the AC power to DC power. For example, the AC adapter 106 may convert the AC power to a DC voltage of 19 volts. In some examples, the battery charger 110 may include a converter to receive a higher voltage from the AC adapter 106 and step down the voltage to a narrow voltage range. For example, with a two cell battery using a narrow voltage range of 8.4 volts, the narrow voltage range may be 8.4 volts +/−5%. The narrow voltage range at the power rail 116 may be then be regulated by the backlight regulator 118 and the PMIC regulator 120 to produce suitable narrow voltage ranges for the panel backlight 122 and the panel electronics 124, respectively. In some examples, the PMIC regulator 120 may support a voltage range that is wider than the operating voltage range of the power rail for tolerance. For example, for a two cell battery operating in a range of 5.6 to 9 volts, the PMIC regulator 120 may be able to operate in a supported voltage range of 5 to 9.4 volts. For example, the panel backlight 122 may use a voltage within a first narrow voltage range and the panel electronics 124 may use a voltage within a second narrow voltage range having a different value. In some examples, the backlight regulator may provide the panel backlight with a particular narrow voltage range within the voltage range of 5-27 volts. For example, the particular narrow voltage range may be based on the luminance to be output by the displays. In some examples, the PMIC regulator 120 may provide the panel electronics 124 with a narrow voltage range of approximately 3.3 volts, with a variance of +/−3% of the input narrow voltage range. In some example, the PMIC regulator 120 may alternatively provide the panel electronics 124 the narrow voltage range with a variance of +/−5% of the input narrow voltage range. In some examples, a higher or lower narrow voltage range may be used based on the display mode or the liquid crystal type. Thus, both the display backlight 118 and the panel electronics 120 may receive appropriate narrow voltage ranges without multiple conversions of voltage from the power source and corresponding power loss. For example, the voltage from the power source may only need to be converted once.

The diagram of FIG. 1 is not intended to indicate that the example system 100 is to include all of the components shown in FIG. 1. Rather, the example system 100 can be implemented using fewer or additional components not illustrated in FIG. 1 (e.g., additional power rails, field-electric transistors, components, etc.). For example, an additional power rail may be included as discussed in FIG. 2 below.

Figure 2:
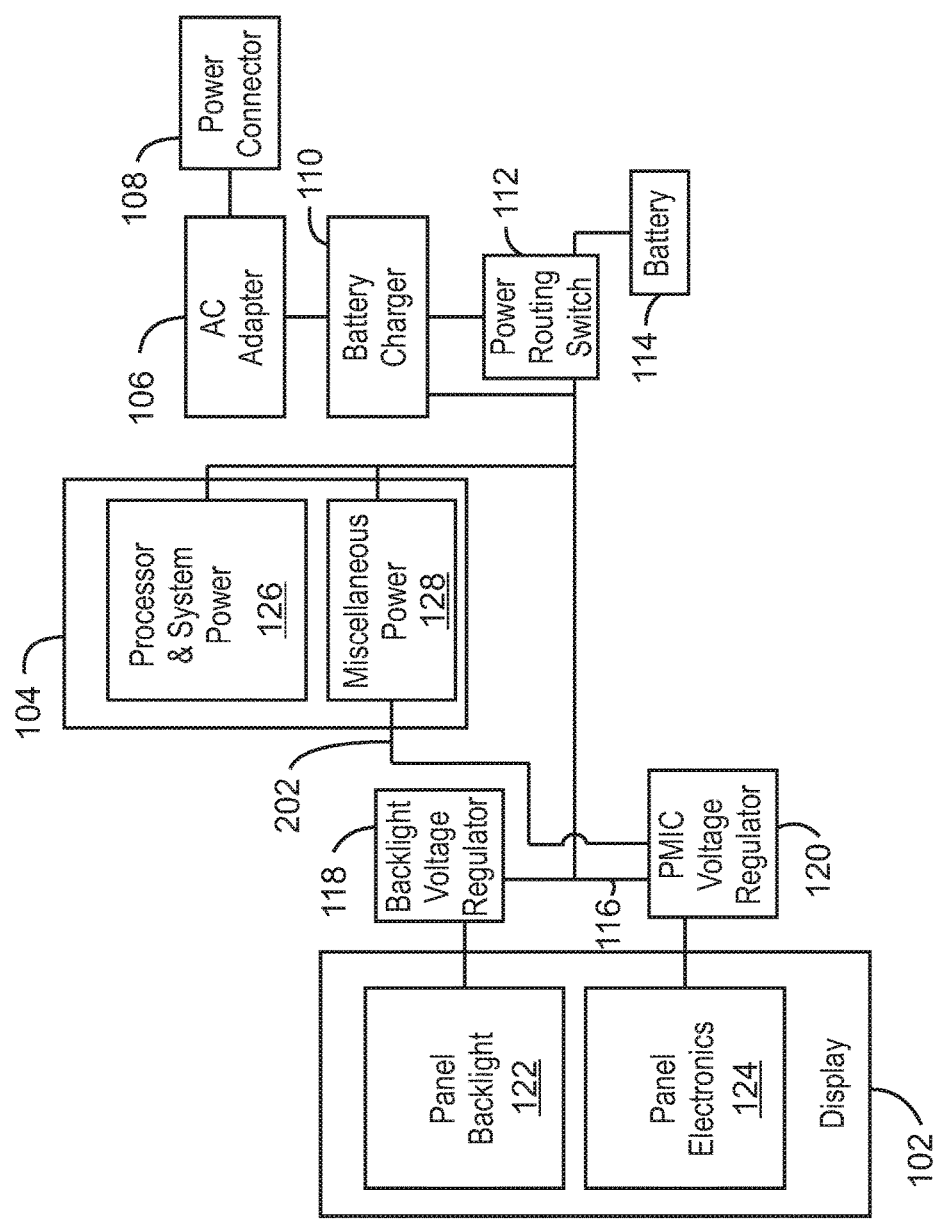
FIG. 2 is a detailed block diagram illustrating example system for powering a mobile device display including a second power rail.

FIG. 2 is a detailed block diagram illustrating example system including a second power rail. The example system is referred to generally by the reference number 200 and can be implemented in the computing device 500 below.

The example system 200 includes similarly numbered elements of FIG. 1 above. In addition, the system 200 includes a second power rail 202 electronically coupled to the miscellaneous power unit 128 of the power management unit and system 104 and the PMIC regulator 120. For example, the second power rail 202 may provide an addition narrow voltage range from the miscellaneous power unit 128 to the PMIC regulator 120.

In some examples, the panel electronics 124 may use a number of narrow voltage ranges during operation. For example, the voltages may be based on display mode or liquid crystal type. Thus, the second power rail 202 may provide an additional narrow voltage range from the miscellaneous power unit 128 to the PMIC regulator 120. The PMIC regulator 120 may then provide multiple narrow voltage ranges to the panel electronics 124 of the display 102. For example, the PMIC regulator 120 may provide the multiple narrow voltage ranges using any combination of the voltages from the power rail 116 and the second power rail 202. In some examples, if the narrow voltage range from the second power rail matches the narrow voltage range to be used by one of the display components, then power may be saved by not having to convert the narrow voltage range of the power rail 116 and using the narrow voltage range of the second power rail instead.

The diagram of FIG. 2 is not intended to indicate that the example system 200 is to include all of the components shown in FIG. 2. Rather, the example system 200 can be implemented using fewer or additional components not illustrated in FIG. 2 (e.g., additional power rails, field-electric transistors, components, etc.).

Figure 3:
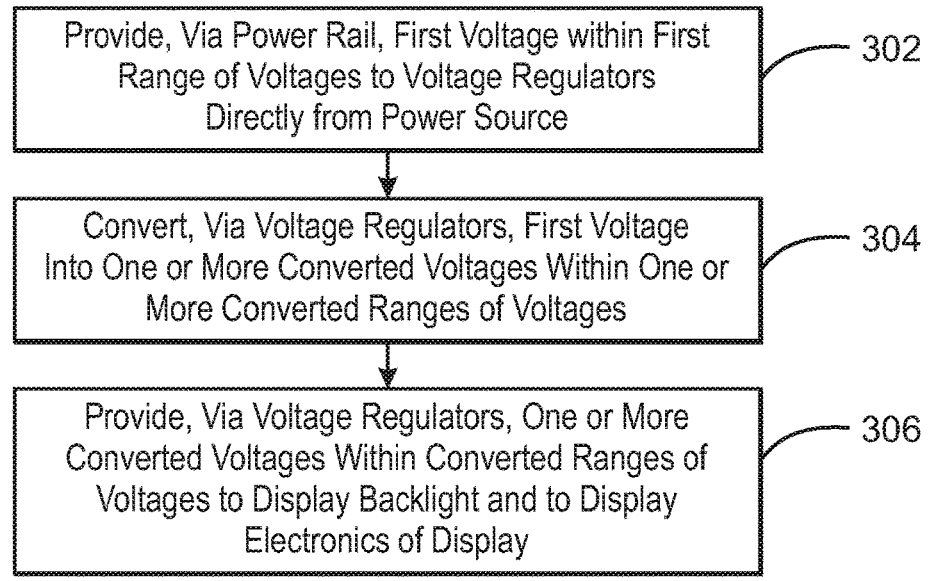
FIG. 3 is a flow chart illustrating a method for powering a mobile device display.

FIG. 3 is a flow chart illustrating a method for powering a mobile device display. The example method is generally referred to by the reference number 300 and can be implemented in the computing device 500 below. For example, the example method 300 can be implemented in the display interface 516 and the display device 518 of the computing device 500.

At block 302, the computing device provides, via a power rail, a first voltage within a first range of voltages to voltage regulators directly from a power source. For example, the power source can be a two cell or three cell battery. In some examples, the voltage may be in the range of 6 to 8.4 volts. In some examples, the voltage may be in the range of 9 to 12 volts. In some examples, the voltage may be routed from the power source via a low-voltage field-effect transistor. For example, the transistor may be a low-voltage MOSFET.

At block 304, the computing device converts, via the voltage regulators, the first voltage into one or more converted voltages within one or more converted ranges of voltages. In some examples, the power regulators may be linear voltage regulators. In some examples, the voltage regulators may be pulse width modulators (PWMs) to perform pulse width modulation. For example, the voltage regulators may receive a first voltage that is higher than the converted voltage and reduce the first voltage to the converted voltage. In some examples, the received first voltage may not have a stable value. The voltage regulators may be also used to maintain a constant voltage level within the converted range of voltages.

At block 306, the computing device provides, via the voltage regulators, the one or more converted voltages within one or more converted range of voltages to a display backlight and to display electronics of the display. For example, the display backlight may use a second voltage within a second range of voltages and the display electronics may use a third voltage within a third range of voltages. Thus, a second voltage may be supplied to the display backlight and a third voltage may be provided to the display electronics from the power source without converting the voltages multiple times. The computing device may thereby avoid power loss due to power conversions.

This process flow diagram is not intended to indicate that the blocks of the example process 300 are to be executed in any particular order, or that all of the blocks are to be included in every case. Further, any number of additional blocks not shown may be included within the example process 300, depending on the details of the specific implementation. For example, the computing device can provide, via a second rail, a fourth voltage in a fourth range of voltages to one of the voltage regulators as shown in FIG. 2 above. In some examples, the voltage regulator may then use the fourth voltage to provide one or more additional voltages within additional ranges of voltages to the display electronics. For example, the one or more additional voltage may be close to or within the fourth range of voltages and thus may reduce power loss due to voltage conversion.

Figure 4:
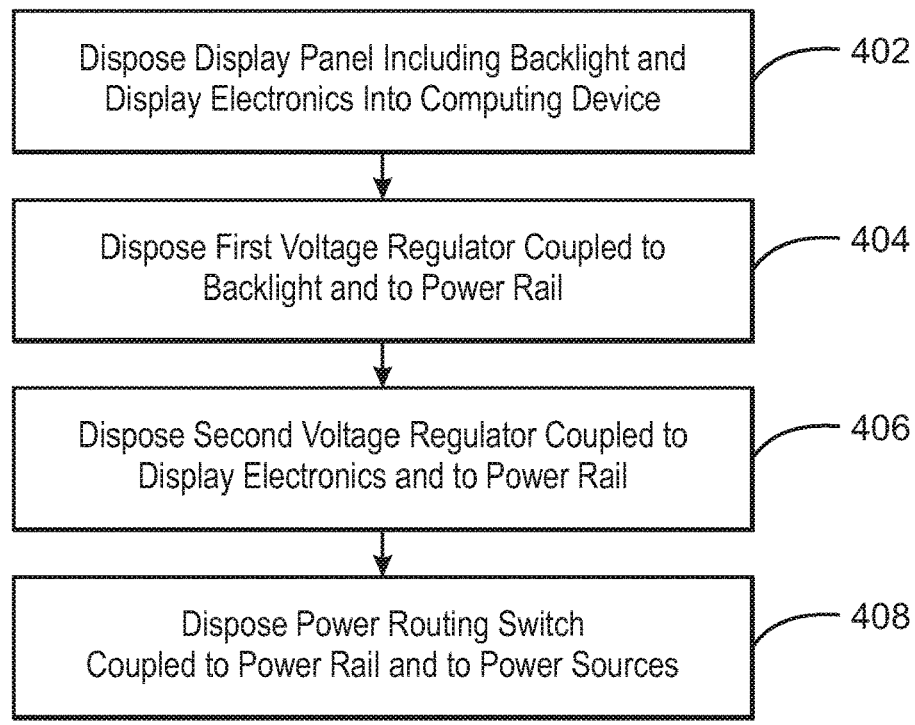
FIG. 4 is a flow chart illustrating a method for manufacturing a mobile computing device with a display.

FIG. 4 is a flow chart illustrating a method for manufacturing a computing device with a display. For example, the example method 400 may be used to manufacture the computing device 500 of FIG. 5 below.

At block 402, a display panel including a backlight and a display electronics is disposed into the computing device. In some examples, the display panel may be an LCD, µLED, OLED, plasma, or electroluminescent display (ELD) display. The backlight may be any suitable light source for providing illumination to the display panel. For example, the backlight can be any number of light-emitting diodes (LEDs) or electrodes. In some examples, the display electronics may include a pixel array, among other display electronics.

At block 404, a first voltage regulator coupled to the backlight and to a power rail is disposed. For example, the first voltage regulator can provide a voltage within a range of voltages to the backlight. In some examples, the first voltage regulator may be a linear voltage regulator. In some examples, the first voltage regulator may be a pulse width modulator. In some examples, the first voltage regulator may include a negative feedback mechanism. In some examples, the power rail may be electronically coupled to a power source. For example, the power source may provide a voltage within a narrower range of voltages within the larger range of 5.6-9 volts. For example, the narrower range may be plus or minus three percent of an input voltage value that is used to output the voltage. In some examples, the power source can provide a voltage within the range of 9 to 12.6 volts. In some examples, the first voltage regulator may provide a voltage based on the voltage to be used by the backlight.

At block 406, a second voltage regulator coupled to display electronics and to the power rail is disposed. For example, the second voltage regulator can provide a second voltage within a second range of voltages to the display electronics. In some examples, the second voltage regulator may be a linear voltage regulator. In some examples, the second voltage regulator may be a pulse width modulator. In some examples, the second voltage regulator may include a negative feedback mechanism. In some examples, the second voltage regulator may be further coupled to a second power rail. For example, the second power rail may be coupled to a second power source that is to provide an additional voltage to the second voltage regulator. In some examples, the second voltage regulator may provide a voltage based on the voltage to be used by the display electronics. For example, the second power rail may provide voltage of 1.8 volts +/−5% or 2.5 volts +/−5% from a miscellaneous power block of the system. In some examples, the narrow voltage range from the second power rail may be used for the timing controller or for power saving purposes. For example, display electronics using lower voltages may be supplied power via second voltage regulator using the voltage from the second power rail. Thus, power loss may be reduced by not having to convert the voltages multiple times.

At block 408, a power routing switch is disposed coupled to the power rail and to power sources. For example, the power routing switch may be a FET. In some examples, the power routing switch may be a low-voltage MOSFET. In some examples, the power routing switch may provide a voltage from one of the power sources. For example, the power routing switch may switch between a battery and a battery charge, both providing the same voltage within a range of voltages. For example, the range may be within 3% of an input voltage used to output the voltage.

This process flow diagram is not intended to indicate that the blocks of the example process 400 are to be executed in any particular order, or that all of the blocks are to be included in every case. Further, any number of additional blocks not shown may be included within the example process 400, depending on the details of the specific implementation.

Figure 5:
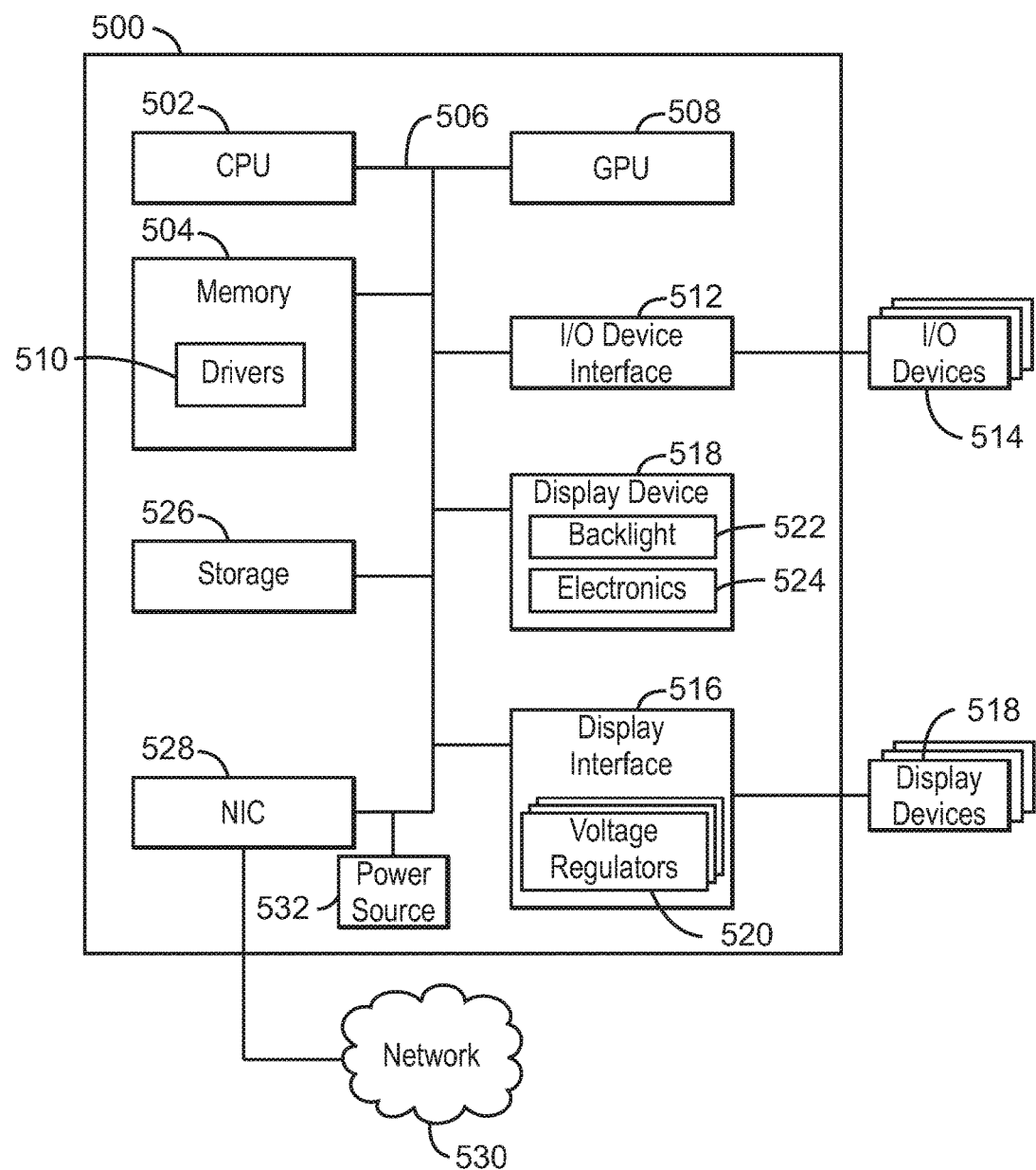
FIG. 5 is block diagram illustrating an example computing device that can power a display using narrow voltage ranges.

Referring now to FIG. 5, a block diagram is shown illustrating an example computing device that can power a display using narrow voltage ranges. The computing device 500 may be used to implement systems 100 and 200 and the process 300 of FIGS. 1-3 and can be provided by the process 400 of FIG. 4 above. The computing device 500 may be, for example, a laptop computer, desktop computer, tablet computer, mobile phone, mobile device, or camera, among others. In some examples, the computing device 500 may be a smart camera or a digital security surveillance camera. The computing device 500 may include a central processing unit (CPU) 502 that is configured to execute stored instructions, as well as a memory device 504 that stores instructions that are executable by the CPU 502. The CPU 502 may be coupled to the memory device 504 by a bus 506. Additionally, the CPU 502 can be a single core processor, a multi-core processor, a computing cluster, or any number of other configurations. Furthermore, the computing device 500 may include more than one CPU 502. In some examples, the CPU 502 may be a system-on-chip (SoC) with a multi-core processor architecture. In some examples, the CPU 502 can be a specialized digital signal processor (DSP) used for image processing. The memory device 504 can include random access memory (RAM), read only memory (ROM), flash memory, or any other suitable memory systems. For example, the memory device 504 may include dynamic random access memory (DRAM).

The memory device 504 can include random access memory (RAM), read only memory (ROM), flash memory, or any other suitable memory systems. For example, the memory device 504 may include dynamic random access memory (DRAM).

The computing device 500 may also include a graphics processing unit (GPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a user of the computing device 500.

The memory device 504 may include device drivers 510 that are configured to execute the instructions for powering device displays. The device drivers 510 may be software, an application program, application code, or the like.

The CPU 502 may also be connected through the bus 506 to an input/output (I/O) device interface 512 configured to connect the computing device 500 to one or more I/O devices 514. The I/O devices 514 may include, for example, a keyboard and a pointing device, wherein the pointing device may include a touchpad or a touchscreen, among others. The I/O devices 514 may be built-in components of the computing device 500, or may be devices that are externally connected to the computing device 500. In some examples, the memory 504 may be communicatively coupled to I/O devices 514 through direct memory access (DMA).

The CPU 502 may also be linked through the bus 506 to a display interface 516 configured to connect the computing device 500 to a display device 518. The display device 518 may include a display screen that is a built-in component of the computing device 500. The display device 518 may also include a computer monitor, television, or projector, among others, that is internal to or externally connected to the computing device 500. In some examples, the display interface 516 may include one or more voltage regulators 520 to provide one or more narrow voltage ranges to the display devices 518 from an input narrow voltage range of one or more power rails of the bus 506. For example, a first voltage regulator 520 may provide power to a backlight 522 of a display device 518 and a second voltage regulator 520 may provide power to display electronics 524 of a display device 518. In some examples, the voltage regulators 520 may be linear voltage regulators. For example, the resistance of the regulator may vary in accordance with a power load resulting in a constant output narrow voltage range. In some examples, the voltage regulators 520 may be pulse width modulation (PWM) voltage regulators. For example, an average value of voltage fed to the backlight 522 or the display electronics 524 can be controlled by turning a switch in the voltage regulator 520 on and off at a rate measuring in tens or hundreds of hertz (Hz). In some examples, the minimum pulse width of the PWM may be hundreds of kilohertz (kHz) to megahertz (MHz).

The computing device 500 also includes a storage device 526. The storage device 526 is a physical memory such as a hard drive, an optical drive, a flash memory drive such as a thumb drive, an array of drives, a solid-state drive, or any combinations thereof. The storage device 526 may also include remote storage drives.

The computing device 500 may also include a network interface controller (NIC) 528. The NIC 528 may be configured to connect the computing device 500 through the bus 506 to a network 530. The network 530 may be a wide area network (WAN), local area network (LAN), or the Internet, among others. In some examples, the device may communicate with other devices through a wireless technology. For example, the device may communicate with other devices via a wireless local area network (WLAN) connection. In some examples, the device may connect and communicate with other devices via Bluetooth® or similar technology.

The computing device 500 may also include a power source 532. For example, the power source 532 may include an alternating current (AC) adapter to convert AC to direct current coupled to a battery charger to provide a narrow voltage range to the bus 506. In some examples, the power source 532 may also include a battery. For example, the battery may be a two cell, a three cell, or a four cell battery. The battery may also provide a narrow voltage range that can be the same narrow voltage range provided by the battery charger.

The block diagram of FIG. 5 is not intended to indicate that the computing device 500 is to include all of the components shown in FIG. 5. Rather, the computing device 500 can include fewer or additional components not illustrated in FIG. 5, such as additional buffers, additional processors, and the like. The computing device 500 may include any number of additional components not shown in FIG. 5, depending on the details of the specific implementation.

EXAMPLES

Example 1 is an apparatus for powering a mobile device display. The apparatus includes a first voltage regulator to be electronically coupled to a display backlight and to a power rail. The power rail is coupled to a power source to provide a first voltage within a first range of voltages. The first voltage regulator can provide a second voltage within a second range of voltages to the display backlight. The apparatus includes a second voltage regulator to be electronically coupled to display electronics of the mobile device display and the power rail. The second voltage regulator can provide a third voltage within a third range of voltages to the display electronics. The first range of voltages, the second range of voltages, and the third range of voltages, include different voltages.

Example 2 includes the apparatus of example 1, including or excluding optional features. In this example, the second voltage regulator is further to be electronically coupled to a second power rail coupled to a power management system. The power management system is coupled to the power rail.

The second power rail can provide an additional voltage within an additional range of voltages to the second voltage regulator. The additional range of voltages is different from the first range of voltages.

Example 3 includes the apparatus of any one of examples 1 to 2, including or excluding optional features. In this example, the apparatus includes a power routing switch to be electronically coupled to the power rail to provide the first voltage from the power source.

Example 4 includes the apparatus of any one of examples 1 to 3, including or excluding optional features. In this example, the power source includes two or more cells.

Example 5 includes the apparatus of any one of examples 1 to 4, including or excluding optional features. In this example, the first range of voltages, the second range of voltages, and the third range of voltages, each include a differing output voltage value plus or minus three percent of a differing input voltage value.

Example 6 includes the apparatus of any one of examples 1 to 5, including or excluding optional features. In this example, the second range of voltages includes a smaller range within a larger range of 6 to 8.4 volts.

Example 7 includes the apparatus of any one of examples 1 to 6, including or excluding optional features. In this example, the first voltage range a smaller range within a larger range of 9 to 12.6 volts.

Example 8 includes the apparatus of any one of examples 1 to 7, including or excluding optional features. In this example, the first voltage regulator or the second voltage regulator includes a linear voltage regulator.

Example 9 includes the apparatus of any one of examples 1 to 8, including or excluding optional features. In this example, the first voltage regulator or the second voltage regulator includes a pulse width modulator regulator.

Example 10 includes the apparatus of any one of examples 1 to 9, including or excluding optional features. In this example, the apparatus includes a power routing switch including a low-voltage field-effect transistor.

Example 11 is a method for powering a mobile device display. The method includes providing, via a power rail, a first voltage within a first range of voltages to voltage regulators directly from a power source. The method includes converting, via the voltage regulators, the first voltage into one or more converted voltages within one or more converted ranges of voltages. The method includes providing, via the voltage regulators, a converted voltage within a converted range of voltages to a display backlight and a display electronics of the display. The first range of voltages and the converted ranges of voltages include different voltages.

Example 12 includes the method of example 11, including or excluding optional features. In this example, the method includes providing, via a second rail, a second voltage within a second range of voltages to one of the voltage regulators.

Example 13 includes the method of any one of examples 11 to 12, including or excluding optional features. In this example, the method includes providing, via a second rail, an additional voltage within an additional range of voltages to one of the voltage regulators, the additional voltage to be used to generate a second voltage within a second range of voltages for the display electronics.

Example 14 includes the method of any one of examples 11 to 13, including or excluding optional features. In this example, the method includes providing, via a second rail, an additional voltage within an additional range of voltages to one of the voltage regulators from a miscellaneous power block of the mobile device.

Example 15 includes the method of any one of examples 11 to 14, including or excluding optional features. In this example, providing, via the power rail, the first voltage to the voltage regulators directly from the power source includes providing the first voltage from a two cell battery, a three cell battery, or a four cell battery.

Example 16 includes the method of any one of examples 11 to 15, including or excluding optional features. In this example, providing the converted voltage to the display backlight and the display electronics includes maintaining the converted voltage within the converted range of voltages.

Example 17 includes the method of any one of examples 11 to 16, including or excluding optional features. In this example, converting the voltage into the one or more converted voltages includes using pulse width modulation to control the one or more converted ranges of voltages.

Example 18 includes the method of any one of examples 11 to 17, including or excluding optional features. In this example, providing the first voltage includes providing the first voltage from the power source without multiple conversions.

Example 19 includes the method of any one of examples 11 to 18, including or excluding optional features. In this example, providing the first voltage to the voltage regulators directly from the power source includes routing the first voltage from the power source via a low-voltage power routing switch.

Example 20 includes the method of any one of examples 11 to 19, including or excluding optional features. In this example, providing the first voltage to the voltage regulators directly from the power source includes routing the first voltage from the power source via a low-voltage field-effect transistor.

Example 21 is a system for powering a mobile device display. The system includes a display panel including a display backlight and display electronics. The system includes a first voltage regulator to be electronically coupled to the display backlight and to a power rail. The power rail is coupled to a power source to provide a first voltage within a first range of voltages. The first voltage regulator is to provide a second voltage within a second range of voltages to the display backlight. The system includes a second voltage regulator to be electronically coupled to the display electronics and the power rail to provide a third voltage within a third range of voltages to the display electronics. The first range of voltages, the second range of voltages, and the third range of voltages, include different voltages.

Example 22 includes the system of example 21, including or excluding optional features. In this example, the second voltage regulator is further to be electronically coupled to a second power rail coupled to a power management system, the power management system coupled to the power rail. The second power rail is to provide a fourth voltage within a fourth range of voltages to the second voltage regulator.

Example 23 includes the system of any one of examples 21 to 22, including or excluding optional features. In this example, the system includes a power routing switch to be electronically coupled to the power rail to provide a fourth voltage within a fourth range of voltages to the power rail from the power source.

Example 24 includes the system of any one of examples 21 to 23, including or excluding optional features. In this example, the power source includes a two cell, a three cell, or a four cell battery.

Example 25 includes the system of any one of examples 21 to 24, including or excluding optional features. In this example, the mobile device display includes a resolution of full high-definition or higher resolution.

Example 26 includes the system of any one of examples 21 to 25, including or excluding optional features. In this example, the first voltage regulator or the second voltage regulator includes a linear voltage regulator.

Example 27 includes the system of any one of examples 21 to 26, including or excluding optional features. In this example, the first voltage regulator or the second voltage regulator includes a pulse width modulator.

Example 28 includes the system of any one of examples 21 to 27, including or excluding optional features. In this example, the first voltage regulator or the second voltage regulator includes a negative feedback mechanism.

Example 29 includes the system of any one of examples 21 to 28, including or excluding optional features. In this example, power source includes a two cell, a three cell, or a four cell battery.

Example 30 includes the system of any one of examples 21 to 29, including or excluding optional features. In this example, the system includes a power routing switch including a low-voltage field-effect transistor to route the first voltage within the first voltage range from two or more power sources.

Example 31 is a system for powering a mobile device display. The system includes a display panel including a display backlight and display electronics. The system includes means for providing a first voltage within a first range of voltages to the display backlight. The means for providing the first narrow voltage range electronically coupled to the display backlight and to a power rail. The power rail is coupled to a power source to provide a second voltage within a second range of voltages. The system includes means for providing a third voltage within a third range of voltages to the display electronics. The means for providing the third voltage to be electronically coupled to the display electronics and the power rail. The first range of voltages, the second range of voltages, and the third range of voltages, include different voltages.

Example 32 includes the system of example 31, including or excluding optional features. In this example, the means for providing the second voltage is further to be electronically coupled to a second power rail coupled to a power management system. The power management system coupled to the power rail, the second power rail to provide an additional voltage within an additional range of voltages to the means for providing the second voltage.

Example 33 includes the system of any one of examples 31 to 32, including or excluding optional features. In this example, the system includes means for providing the second voltage to the power rail to be electronically coupled to the power rail.

Example 34 includes the system of any one of examples 31 to 33, including or excluding optional features. In this example, the system includes means for providing the second voltage coupled to the power rail. The means for providing the second voltage includes a two cell, a three cell, or a four cell battery.

Example 35 includes the system of any one of examples 31 to 34, including or excluding optional features. In this example, the mobile device display includes a resolution of full high-definition or higher resolution.

Example 36 includes the system of any one of examples 31 to 35, including or excluding optional features. In this example, the means for providing the first voltage or the means for providing the third voltage includes a linear voltage regulator.

Example 37 includes the system of any one of examples 31 to 36, including or excluding optional features. In this example, the means for providing the first voltage or the means for providing the third voltage includes a pulse width modulator.

Example 38 includes the system of any one of examples 31 to 37, including or excluding optional features. In this example, the means for providing the first voltage or the means for providing the third voltage includes a negative feedback mechanism.

Example 39 includes the system of any one of examples 31 to 38, including or excluding optional features. In this example, the power source includes a two cell, a three cell, or a four cell battery.

Example 40 includes the system of any one of examples 31 to 39, including or excluding optional features. In this example, the system includes means for routing the second voltage within the second range of voltages from two or more power sources.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for powering a mobile device display, comprising:
   a first voltage regulator to be electronically coupled to a display backlight and to a first power rail, the first power rail coupled to a power source to provide a first voltage within a first range of voltages, the first voltage regulator to provide a second voltage within a second range of voltages to the display backlight; and
   a second voltage regulator to be electronically coupled to display electronics of the mobile device display and to the first power rail, the second voltage regulator to provide a third voltage within a third range of voltages to the display electronics, wherein the first range of voltages, the second range of voltages, and the third range of voltages comprise different voltages, wherein the second voltage regulator is further to be electronically coupled to a second power rail coupled to a miscellaneous power unit of a power management system, the miscellaneous power unit coupled to the first power rail, wherein the miscellaneous power unit of the power management system is to provide power for universal serial bus (USB) components of the apparatus and is to provide a fourth voltage within a fourth range of voltages via the second power rail to the second voltage regulator during a power saving state of the mobile device display, wherein the fourth range of voltages is different from the first range of voltages.

2. The apparatus of claim 1, comprising a power routing switch to be electronically coupled to the first power rail to provide the first voltage from the power source.

3. The apparatus of claim 1, wherein the power source comprises two or more cells.

4. The apparatus of claim 1, wherein the first range of voltages, the second range of voltages, and the third range of voltages, each comprise a differing output voltage value plus or minus three percent of a differing input voltage value.

5. The apparatus of claim 1, wherein the second range of voltages comprises a smaller range within a larger range of 6 to 8.4 volts.

6. The apparatus of claim 1, wherein the first voltage range comprises a smaller range within a larger range of 9 to 12.6 volts.

7. The apparatus of claim 1, wherein the first voltage regulator or the second voltage regulator comprises a linear voltage regulator.

8. The apparatus of claim 1, wherein the first voltage regulator or the second voltage regulator comprises a pulse width modulator regulator.

9. The apparatus of claim 1, comprising a power routing switch comprising a low-voltage field-effect transistor.

10. A method for powering a mobile device display, comprising:
    providing, via a first power rail, a first voltage within a first range of voltages to voltage regulators directly from a power source;
    converting, via the voltage regulators, the first voltage into one or more converted voltages within one or more converted ranges of voltages;
    providing, via the voltage regulators, a converted voltage within a converted range of voltages to a display backlight and a display electronics of the display, wherein the first range of voltages and the converted ranges of voltages comprise different voltages; and
    providing, via a miscellaneous power unit of a power management system coupled to the first power rail and a second power rail, a second voltage within a second range of voltages to one of the voltage regulators, wherein one of the voltage regulators are coupled to the first power rail and the second power rail, wherein the miscellaneous power unit of the power management system is to provide power for universal serial bus (USB) components of the apparatus and is to provide a fourth voltage within a fourth range of voltages via the second power rail to the second voltage regulator during a power saving state of the mobile device display, wherein the fourth range of voltages is different from the first range of voltages.

11. The method of claim 10, wherein converting the first voltage into the one or more converted voltages comprises using pulse width modulation to control the one or more converted ranges of voltages.

12. The method of claim 10, wherein providing the first voltage to the voltage regulators directly from the power source comprises routing the first voltage from the power source via a low-voltage field-effect transistor.

13. The method of claim 10, wherein providing the converted voltage to the display backlight and the display electronics comprises maintaining the converted voltage within the converted range of voltages.

14. A system for powering a mobile device display, comprising:
    a display panel comprising a display backlight and display electronics;
    a first voltage regulator to be electronically coupled to the display backlight and to a first power rail, the first power rail coupled to a power source to provide a first voltage within a first range of voltages, the first voltage regulator to provide a second voltage within a second range of voltages to the display backlight; and
    a second voltage regulator to be electronically coupled to the display electronics and the first power rail to provide a third voltage within a third range of voltages to the display electronics, wherein the first range of voltages, the second range of voltages, and the third range of voltages, comprise different voltages, wherein the second voltage regulator is further to be electronically coupled to a second power rail coupled to a miscellaneous power unit of a power management system, the miscellaneous power unit coupled to the first power rail, wherein the miscellaneous power unit of the power management system is to provide power for universal serial bus (USB) components of the apparatus and is to provide a fourth voltage within a fourth range of voltages to the second voltage regulator via the second power rail during a power saving state of the mobile device display.

15. The system of claim 14, comprising a power routing switch to be electronically coupled to the first power rail to provide the first voltage within the first range of voltages to the power rail from the power source.

16. The system of claim 14, wherein the power source comprises a two cell, a three cell, or a four cell battery.

17. The system of claim 14, wherein the mobile device display comprises a resolution of full high-definition or higher resolution.

18. The system of claim 14, wherein the fourth voltage is to further be used for powering a timing controller of the mobile device display.

\* \* \* \* \*